(12) United States Patent
Bai et al.

(10) Patent No.: US 9,189,041 B2
(45) Date of Patent: Nov. 17, 2015

(54) METHOD AND APPARATUS FOR CONTROLLING TERMINAL POWER

(75) Inventors: Jian Bai, Huizhou (CN); Yufei Tang, Huizhou (CN)

(73) Assignee: HUIZHOU TCL MOBILE COMMUNICATIONS CO., LTD., Huizhou (CN)

( * ) Notice: Subject to any disclaimer, the term of this patent is extended or adjusted under 35 U.S.C. 154(b) by 228 days.

(21) Appl. No.: 13/702,310

(22) PCT Filed: Oct. 9, 2011

(86) PCT No.: PCT/CN2011/080560
§ 371 (c)(1),
(2), (4) Date: Dec. 6, 2012

(87) PCT Pub. No.: WO2012/071944
PCT Pub. Date: Jun. 7, 2012

(65) Prior Publication Data
US 2013/0290744 A1    Oct. 31, 2013

(30) Foreign Application Priority Data
Dec. 2, 2010  (CN) .......................... 2010 1 0570748

(51) Int. Cl.
| | |
|---|---|
| H04B 7/00 | (2006.01) |
| G06F 1/26 | (2006.01) |
| H04W 52/14 | (2009.01) |
| H04W 52/22 | (2009.01) |
| H04W 52/36 | (2009.01) |
| H04B 17/13 | (2015.01) |
| H04B 17/26 | (2015.01) |

(52) U.S. Cl.
CPC *G06F 1/26* (2013.01); *H04B 17/13* (2015.01); *H04B 17/26* (2015.01); *H04W 52/146* (2013.01); *H04W 52/228* (2013.01); *H04W 52/367* (2013.01); *Y02B 60/50* (2013.01)

(58) Field of Classification Search
USPC ........... 455/550.1, 550, 522, 69–70; 370/310, 370/315–320
See application file for complete search history.

(56) References Cited

U.S. PATENT DOCUMENTS

| | | | |
|---|---|---|---|
| 5,893,036 A | 4/1999 | Trandai et al. | |
| 6,029,074 A * | 2/2000 | Irvin | ............................. 455/571 |

(Continued)

FOREIGN PATENT DOCUMENTS

| | | |
|---|---|---|
| CN | 1192113 A | 9/1998 |
| CN | 1302486 A | 7/2001 |
| CN | 101075833 A | 11/2007 |

(Continued)

*Primary Examiner* — Fayyaz Alam
(74) *Attorney, Agent, or Firm* — Mark M. Friedman

(57) ABSTRACT

The present invention provides a method and an apparatus for controlling terminal power. The method includes the following steps of: determining whether a power control level set in the terminal is reached or not when controlling the terminal power; if yes, then adjusting a power of the power control level based on a calibration parameter configured in the terminal within a rated output power range corresponding to the power control level; wherein the calibration parameter is 1 dBm; controlling an output power of the terminal according to the adjusted power. The present invention can further perform an accurate terminal power control for reducing power consumption, conserving resources, and increasing system capacity based on a compatibility with conventional power control.

15 Claims, 5 Drawing Sheets

(56) References Cited

U.S. PATENT DOCUMENTS

2007/0243895 A1    10/2007    Koo et al.
2011/0136493 A1*    6/2011    Dimpflmaier et al. ........ 455/450

FOREIGN PATENT DOCUMENTS

| | | |
|---|---|---|
| CN | 101990285 A | 3/2011 |
| WO | 2007117109 | 10/2007 |

* cited by examiner

FIG. 2A

| Power Control Level | Rated Output Power | Condition Error (Normal) | Condition Error (Extreme) |
|---|---|---|---|
| 0-2 | 39 | ±2 | ±2.5 |
| 3 | 37 | ±3 | ±4 |
| 4 | 35 | ±3 | ±4 |
| 5 | 33 | ±3 | ±4 |
| 6 | 31 | ±3 | ±4 |
| 7 | 29 | ±3 | ±4 |
| 8 | 27 | ±3 | ±4 |
| 9 | 25 | ±3 | ±4 |
| 10 | 23 | ±3 | ±4 |
| 11 | 21 | ±3 | ±4 |
| 12 | 19 | ±3 | ±4 |
| 13 | 17 | ±3 | ±4 |
| 14 | 15 | ±3 | ±4 |
| 15 | 13 | ±3 | ±4 |
| 16 | 11 | ±3 | ±4 |
| 17 | 10 | ±1 | ±2 |
| 18 | 9 | ±1 | ±2 |
| 19 | 8 | ±1 | ±2 |
| 20 | 7 | ±1 | ±2 |
| 23 | 4 | ±1 | ±2 |
| 24 | 3 | ±1 | ±2 |
| 25 | 2 | ±1 | ±2 |
| 26 | 1 | ±1 | ±2 |
| 27-31 | 1 | ±1 | ±2 |

FIG. 2B

| Power Control Level | Rated Output Power | Condition Error (Normal) | Condition Error (Extreme) |
|---|---|---|---|
| 29 | 36 | ±2 | ±2.5 |
| 30 | 34 | ±3 | ±4 |
| 31 | 32 | ±3 | ±4 |
| 0 | 30 | ±3 | ±4 |
| 1 | 28 | ±3 | ±4 |
| 2 | 26 | ±3 | ±4 |
| 3 | 24 | ±3 | ±4 |
| 4 | 22 | ±3 | ±4 |
| 5 | 20 | ±3 | ±4 |
| 6 | 18 | ±3 | ±4 |
| 7 | 15 | ±3 | ±4 |
| 8 | 12 | ±3 | ±4 |
| 9 | 10 | ±1 | ±2 |
| 10 | 9 | ±1 | ±2 |
| 11 | 8 | ±1 | ±2 |
| 12 | 7 | ±1 | ±2 |
| 13 | 6 | ±1 | ±2 |
| 14 | 5 | ±1 | ±2 |
| 15 | 4 | ±1 | ±2 |
| 16 | 3 | ±1 | ±2 |
| 17 | 2 | ±1 | ±2 |
| 18 | 1 | ±1 | ±2 |
| 19 | 0 | ±1 | ±2 |
| 20 | -1 | ±1 | ±2 |
| 21 | -2 | ±1 | ±2 |
| 22 | -3 | ±1 | ±2 |

FIG. 2C

| Power Control Level | Rated Output Power | Condition Error (Normal) | Condition Error (Extreme) |
|---|---|---|---|
| 29 | 36 | ±2 | ±2,5 |
| 30 | 34 | ±3 | ±4 |
| 31 | 32 | ±3 | ±4 |
| 0 | 30 | ±3 | ±4 |
| 1 | 28 | ±3 | ±4 |
| 2 | 26 | ±3 | ±4 |
| 3 | 24 | ±3 | ±4 |
| 4 | 22 | ±3 | ±4 |
| 5 | 20 | ±3 | ±4 |
| 6 | 18 | ±3 | ±4 |
| 7 | 15 | ±3 | ±4 |
| 8 | 12 | ±3 | ±4 |
| 9 | 10 | ±1 | ±2 |
| 10 | 9 | ±1 | ±2 |
| 11 | 8 | ±1 | ±2 |
| 12 | 7 | ±1 | ±2 |
| 13 | 6 | ±1 | ±2 |
| 14 | 5 | ±1 | ±2 |
| 15 | 4 | ±1 | ±2 |
| 16 | 3 | ±1 | ±2 |
| 17 | 2 | ±1 | ±2 |
| 18 | 1 | ±1 | ±2 |
| 19 | 0 | ±1 | ±2 |
| 20 | -1 | ±1 | ±2 |
| 21 | -2 | ±1 | ±2 |
| 29 | 36 | ±2 | ±2,5 |

METHOD AND APPARATUS FOR CONTROLLING TERMINAL POWER

TECHNICAL FIELD OF THE INVENTION

The present invention relates to a mobile terminal technology, and especially to a method and an apparatus for controlling terminal power.

BACKGROUND OF THE INVENTION

With growing development in the mobile terminal technology, a user's requirements for functions of a mobile terminal are also increasing.

Global system for mobile communications (GSM) is generally utilized in the mobile terminal to accomplish communication. Moreover, a GSM network coverage is getting better and better at present especially in earlier constructed as well as rapidly developed countries and regions such as Europe, China, and the like.

Most of the time the GSM mobile terminal just needs to output a lower power, usually less than 10 dBm, and in practical applications, a power control algorithm for the GSM mobile terminal majorly affects internal power consumption and the network coverage. If the GSM mobile terminal can perform an accurate power control, the most accurate power can be used for transmission, so as to achieve an objective of energy-conservation. Conversely, the GSM mobile terminal has to adopt a power that is higher than a required power value to transmit, in order to ensure the effect of communication. This inevitably increases interference to other terminals in the system, and therefore affecting a network capacity.

In existing technology, power control standards for the GSM mobile terminal have been used from whenever the standards are made. The control precision is not high, and an error is generally larger than 2 dB. This is because technical levels of the terminal power control and an amplifier (PA, Power Amplifier) can not satisfy the requirement of the control precision, and such a wide network coverage and such a huge number of subscribers were not considered when the GSM standards are made.

In short, based on the current situation of the GSM network coverage, it is highly necessary to perform an accurate power control in 1 dBm for the power of the GSM mobile terminal below 10 dBm.

In summary, how to further perform an accurate terminal power control for reducing power consumption and conserving resources based on compatibility with the conventional power control is one of research directions for the mobile terminal technology.

SUMMARY OF THE INVENTION

The technical solution of the present invention is to provide a method and an apparatus for controlling terminal power. An objective is to further perform an accurate terminal power control for reducing power consumption and conserving resources based on the compatibility with the conventional power control.

A technical solution of the present invention is implemented as follows. A method for controlling terminal power includes the steps of: determining and obtaining a terminal type; determining whether a power control level set in the terminal is reached or not according to the terminal type when controlling the terminal power; if yes, adjusting a power of the power control level based on a calibration parameter established in the terminal within a rated output power range corresponding to the power control level; wherein the calibration parameter established in the terminal is 1 dBm; controlling an output power of the terminal according to the adjusted power.

Amongst, the type of the terminal is GSM400, GSM850, or GSM900. The corresponding power control level is from 16 dBm to 26 dBm, and the rated output power range corresponding to the power control level is from 1 dBm to 13 dBm.

Amongst, the terminal type is DCS (Digital Cellular Service). The corresponding power control level is from 9 dBm to 23 dBm, and the rated output power range corresponding to the power control level is from −4 dBm to 10 dBm.

Amongst, the terminal type is PCS (Personal Communication Service). The corresponding power control level is from 9 dBm to 21 dBm, and the rated output power range corresponding to the power control level is from −2 dBm to 10 dBm.

Another technical solution of the present invention is implemented as follows. A method for controlling terminal power includes the steps of: determining whether a power control level set in the terminal is reached or not when controlling the terminal power; if yes, adjusting a power of the power control level based on a calibration parameter configured in the terminal within a rated output power range corresponding to the power control level; wherein the calibration parameter established in the terminal is 1 dBm; controlling an output power of the terminal according to the adjusted power.

Amongst, the step of determining whether the power control level set in the terminal is reached or not comprises the following step of: determining whether the power control level set in the terminal is reached or not according to the terminal type.

Amongst, the terminal type is GSM400, GSM850, or GSM900. The corresponding power control level is from 16 dBm to 26 dBm, and the rated output power range corresponding to the power control level is from 1 dBm to 13 dBm.

Amongst, the terminal type is DCS. The corresponding power control level is from 9 dBm to 23 dBm, and the rated output power range corresponding to the power control level is from −4 dBm to 10 dBm.

Amongst, the terminal type is PCS. The corresponding power control level is from 9 dBm to 21 dBm, and the rated output power range corresponding to the power control level is from −2 dBm to 10 dBm.

Yet another technical solution of the present invention is implemented as follows. An apparatus for controlling terminal power is provided. The apparatus includes: a power control level determination module utilized to determine whether a power control level set in a terminal is reached or not; an adjustment module utilized to adjust a power of the power control level based on a calibration parameter configured in the terminal within a rated output power range corresponding to the power control level; wherein the calibration parameter is 1 dBm; an output power control module utilized to control an output power of the terminal according to the adjusted power.

Amongst, the apparatus further includes: a terminal type determination module utilized to determine a terminal type; the power control level determination module utilized to determine whether the power control level set in the terminal is reached or not according to the terminal type.

Amongst, the terminal type is GSM400, GSM850, or GSM900. The corresponding power control level is from 16 dBm to 26 dBm, and the rated output power range corresponding to the power control level is from 1 dBm to 13 dBm.

Amongst, the terminal type is DCS. The corresponding power control level is from 9 dBm to 23 dBm, and the rated output power range corresponding to the power control level is from −4 dBm to 10 dBm.

Amongst, the terminal type is PCS. The corresponding power control level is from 9 dBm to 21 dBm, and the rated output power range corresponding to the power control level is from −2 dBm to 10 dBm.

Through the above described manner, the embodiments of the present invention can further perform an accurate terminal power control for reducing power consumption and conserving resources based on the compatibility with the conventional power control.

BRIEF DESCRIPTION OF THE DRAWINGS

FIGS. 2A to 2C are respectively various types of power control charts; and

DETAILED DESCRIPTION OF THE INVENTION

With respect to the characteristics and technical contents of the present invention, please refer to the following description in detail and accompanying drawings. The accompanying drawings are just used for the reference and explanation. The present invention should not be limited as illustrated.

Figure 1:
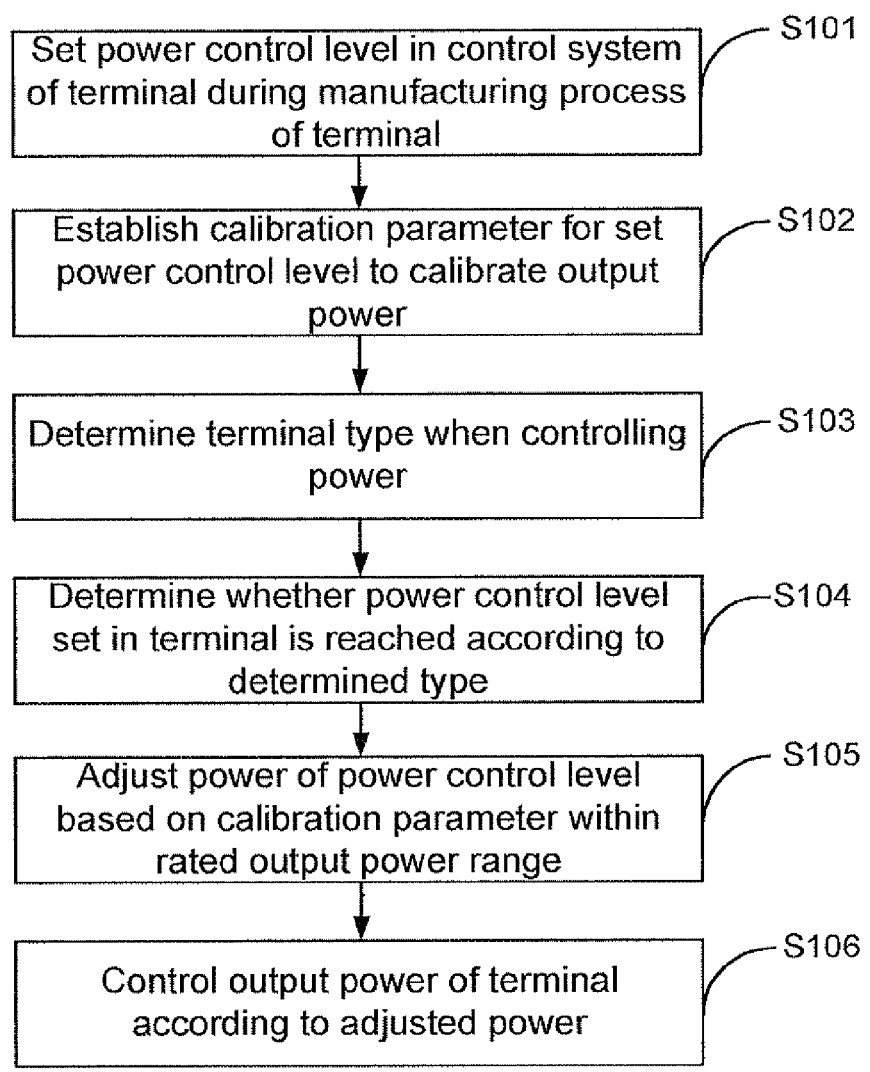
FIG. 1 depicts a flow chart illustrating a method for controlling terminal power according to an embodiment of the present invention.

FIG. 1 depicts a flow chart illustrating a method for controlling terminal power according to an embodiment of the present invention.

At step S101, a power control level is set in a control system of a terminal during the manufacturing process of the terminal.

Specifically, if the terminal type is GSM400, GSM850, or GSM900, then the power control level is set from 16 dBm to 26 dBm. If the terminal is a DCS terminal, then the power control level is set from 9 dBm to 23 dBm. If the terminal is a PCS terminal, then the power control level is set from 9 dBm to 21 dBm.

At step S102, a calibration parameter is established for the set power control level in step S101 and is utilized to calibrate an output power. Here the example given is that the calibration parameter is 1 dBm in the embodiment of the present invention.

At step S103, the terminal type is determined when controlling the power.

In practical execution, the types determined mainly are GSM400, GSM850, or GSM900, DCS, and PCS.

At step S104, whether the power control level set in the terminal is reached or not is determined according to the determined type.

At step S105, a power of the power control level is adjusted based on the calibration parameter established in the terminal within a rated output power range corresponding to the power control level.

Amongst, situations specifically include the following:

a), if the terminal type is GSM400, GSM850, or GSM900, then the set power control level corresponding to the terminal is from 16 dBm to 26 dBm, and the rated output power range corresponding to the power control level is from 1 dBm to 13 dBm.

b), if the type of the terminal is DCS, then the set power control level corresponding to the terminal is from 9 dBm to 23 dBm, and the rated output power range corresponding to the power control level is from −4 dBm to 10 dBm.

c), if the terminal type is PCS, then the set power control level corresponding to the terminal is from 9 dBm to 21 dBm, and the rated output power range corresponding to the power control level is from −2 dBm to 10 dBm.

At step S106, the output power of the terminal is controlled according to the adjusted power.

Referring to FIGS. 2A-2C, FIGS. 2A to 2C are respectively various types of power control charts.

FIG. 2A indicates the GSM400, GSM850, or GSM900 terminal; FIG. 2B indicates the DCS terminal; FIG. 2C indicates the PCS terminal. Obviously, it is not hard to see the following from the charts:

In the embodiment of the present invention, for the terminal type of GSM400, GSM850, or GSM900, a power control capability with a precision of 1 dBm within the rated output power range 1 dBm-13 dBm can be provided. Under this condition, the power control level that is adopted by the terminal type which is from 16 dBm to 26 dBm;

In the embodiment of the present invention, for the terminal type of DCS, the power control capability with the precision of 1 dBm within the rated output power range −4 dBm-10 dBm can be provided. Under this condition, the power control level that is adopted by the type of the terminal is from 9 dBm to 23 dBm;

In the embodiment of the present invention, for the terminal type of PCS, the power control capability with the precision of 1 dBm within the rated output power range −2 dBm-10 dBm can be provided. Under this condition, the power control level that is adopted by the terminal type which is from 9 dBm to 21 dBm;

The embodiment of the present invention satisfies the requirement of differences between 0.5 dBm and 3.5 dBm in each of the power control levels.

Adopting the embodiment of the present invention, the terminal mostly does not need to be modified. It just needs to turn on the power control level below 19 dBm which is not turned on in frequencies of GSM400, GSM850, and GSM900. If it is the DCS or PCS terminal type, the power control level below 15 dBm needs to be turned on.

In the embodiment of the present invention, in the range below 10 dBm, the GSM mobile terminal is capable of providing the accurate power control with the precision of 1 dBm, thereby achieving the objectives of reducing the power consumption, and extremely increasing system capacity.

Figure 3:
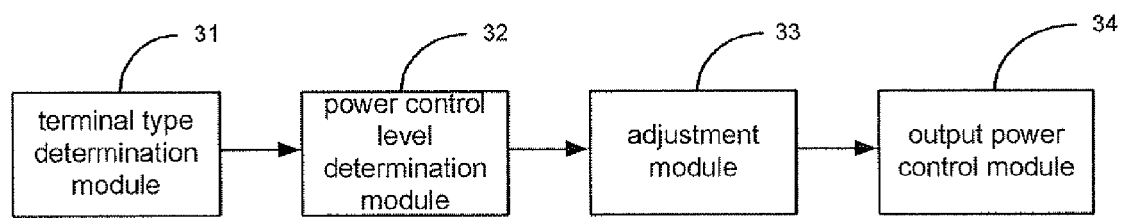
FIG. 3 depicts a block diagram illustrating a terminal power control apparatus according to the embodiment of the present invention.

Referring to FIG. 3, FIG. 3 depicts a block diagram illustrating a power control apparatus according to the embodiment of the present invention. The power control apparatus includes a terminal type determination module 31, a power control level determination module 32, an adjustment module 33, and an output power control module 34.

Amongst, the terminal type determination module 31 is utilized to determine a terminal type;

The power control level determination module 32 is utilized to determine whether a power control level set in a terminal is reached or not;

In practical execution, the power control level determination module 32 is utilized to determine whether the power control level set in the terminal is reached or not according to the terminal type.

The adjustment module 33 is utilized to adjust a power of the power control level based on a calibration parameter established in the terminal within a rated output power range corresponding to the power control level. The calibration parameter of embodiment of the present invention is 1 dBm;

The output power control module 34 is utilized to control an output power of the terminal according to the adjusted power.

In the embodiment of the present invention, the terminal type is GSM400, GSM850, or GSM900. The set power control level corresponding to the terminal is from 16 dBm to 26 dBm, and the rated output power range corresponding to the power control level is from 1 dBm to 13 dBm.

In the embodiment of the present invention, the terminal type is DCS. The set power control level corresponding to the terminal is from 9 dBm to 23 dBm, and the rated output power range corresponding to the power control level is from −4 dBm to 10 dBm.

In the embodiment of the present invention, the terminal type is PCS. The set power control level corresponding to the terminal is from 9 dBm to 21 dBm, and the rated output power range corresponding to the power control level is from −2 dBm to 10 dBm.

The specific working process with respect to the power control apparatus can be referred to the description about the method for controlling power; thus, no further detail will be provided herein.

The embodiment of the present invention can further perform the accurate terminal power control for reducing power consumption, conserving resources, and increasing system capacity based on the compatibility with the conventional power control.

As described above, the present invention has been described with preferred embodiments thereof and it is understood that many changes and modifications to the described embodiments can be carried out without departing from the scope and the spirit of the invention that is intended to be limited only by the appended claims.

What is claimed is:

1. A method for controlling terminal power comprising steps of:
   determining and obtaining a terminal type of a terminal, wherein the terminal type comprises GSM(400, 850, or 900), DCS, and PCS;
   determining whether a power control level set in the terminal is reached or not according to the terminal type when controlling the terminal power of the terminal, wherein the corresponding power control level is from 16 dBm to 26 dBm if the terminal type is GSM(400, 850, or 900); the corresponding power control level is from 9 dBm to 23 dBm if the terminal type is DCS; and the corresponding power control level is from 9 dBm to 21 dBm if the terminal type is PCS;
   adjusting a power of the power control level based on a calibration parameter of 1 dBm, which is established in the terminal, within a rated output power range corresponding to the power control level if the power control level is reached; and
   controlling an output power of the terminal according to the adjusted power.

2. The method according to claim 1, wherein the terminal type is GSM400, GSM850, or GSM900, the corresponding power control level is from 16 dBm to 26 dBm, and the rated output power range corresponding to the power control level is from 1 dBm to 13 dBm.

3. The method according to claim 1, wherein the terminal type is DCS, the corresponding power control level is from 9 dBm to 23 dBm, and the rated output power range corresponding to the power control level is from −4 dBm to 10 dBm.

4. The method according to claim 1, wherein the terminal type is PCS, the corresponding power control level is from 9 dBm to 21 dBm, and the rated output power range corresponding to the power control level is from −2 dBm to 10 dBm.

5. A method for controlling terminal power comprising steps of:
   determining whether a power control level set in a terminal is reached or not according to a terminal type when controlling the terminal power thereof, wherein the terminal type comprises GSM(400, 850, or 900), DCS, and PCS, and wherein the corresponding power control level is from 16 dBm to 26 dBm if the terminal type is GSM (400, 850, or 900); the corresponding power control level is from 9 dBm to 23 dBm if the terminal type is DCS; and the corresponding power control level is from 9 dBm to 21 dBm if the terminal type is PCS;
   if yes, adjusting a power of the power control level based on a calibration parameter established in the terminal within a rated output power range corresponding to the power control level; wherein the calibration parameter established in the terminal is 1 dBm;
   controlling an output power of the terminal according to the adjusted power.

6. The method according to claim 5, wherein the terminal type is GSM400, GSM850, or GSM900, the corresponding power control level is from 16 dBm to 26 dBm, and the rated output power range corresponding to the power control level is from 1 dBm to 13 dBm.

7. The method according to claim 6, wherein the power control level below 19 dBm is turned on.

8. The method according to claim 5, wherein the terminal type is DCS, the corresponding power control level is from 9 dBm to 23 dBm, and the rated output power range corresponding to the power control level is from −4 dBm to 10 dBm.

9. The method according to claim 8, wherein the power control level below 15 dBm is turned on.

10. The method according to claim 5, wherein the terminal type is PCS, the corresponding power control level is from 9 dBm to 21 dBm, and the rated output power range corresponding to the power control level is from −2 dBm to 10 dBm.

11. The method according to claim 10, wherein the power control level below 15 dBm is turned on.

12. An apparatus for controlling terminal power comprising:
   a terminal type determination module utilized to determine a terminal type, wherein the terminal type comprises GSM(400, 850, or 900), DCS, and PCS;
   a power control level determination module utilized to determine whether a power control level set in a terminal is reached or not according to the terminal type, wherein the corresponding power control level is from 16 dBm to 26 dBm if the terminal type is GSM(400, 850, or 900); the corresponding power control level is from 9 dBm to 23 dBm if the terminal type is DCS; and the corresponding power control level is from 9 dBm to 21 dBm if the terminal type is PCS;
   an adjustment module utilized to adjust a power of the power control level based on a calibration parameter established in the terminal within a rated output power range corresponding to the power control level; wherein the calibration parameter is 1 dBm;
   an output power control module utilized to control an output power of the terminal according to the adjusted power.

13. The apparatus according to claim 12, wherein the terminal type is GSM400, GSM850, or GSM900, the corresponding power control level is from 16 dBm to 26 dBm, and the rated output power range corresponding to the power control level is from 1 dBm to 13 dBm.

14. The apparatus according to claim 12, wherein the terminal type is DCS, the corresponding power control level is from 9 dBm to 23 dBm, and the rated output power range corresponding to the power control level is from −4 dBm to 10 dBm.

15. The apparatus according to claim 12, wherein the terminal type is PCS, the corresponding power control level is from 9 dBm to 21 dBm, and the rated output power range corresponding to the power control level is from −2 dBm to 10 dBm.

* * * * *